(No Model.)
W. R. FOX.
DADO CUTTER.
No. 432,824. Patented July 22, 1890.
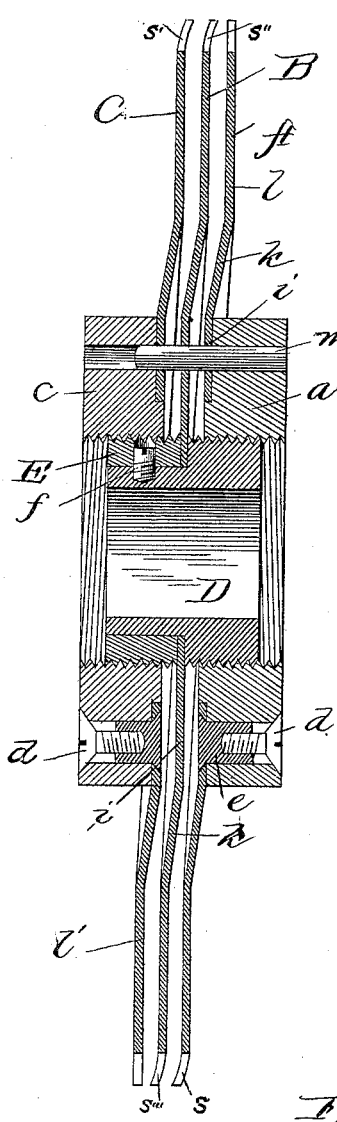
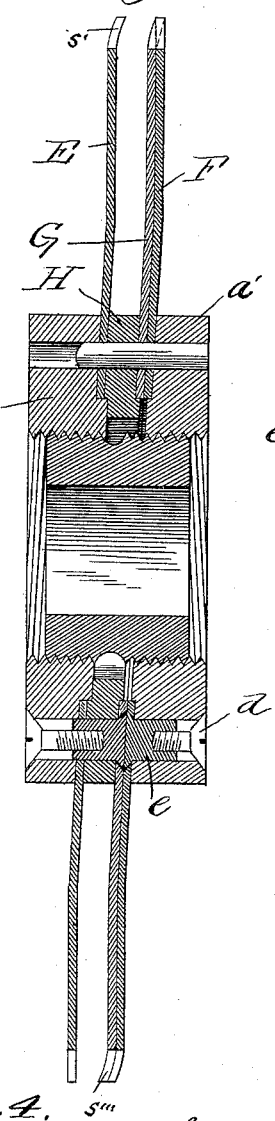
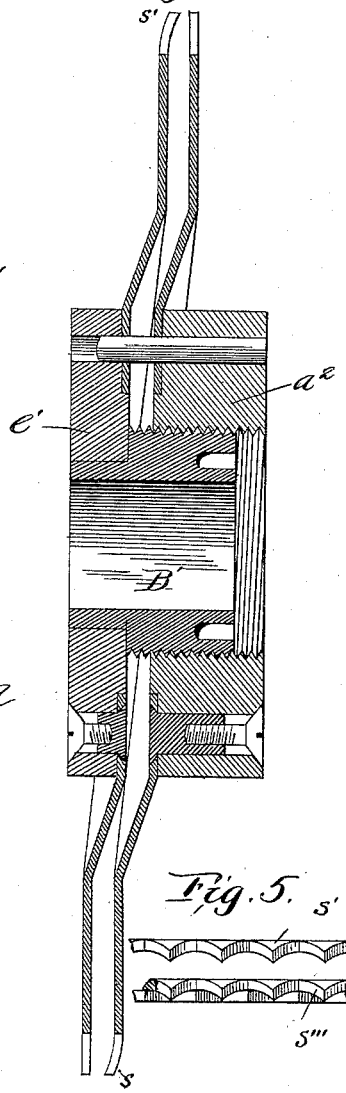
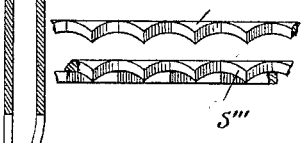
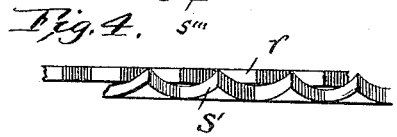
Witnesses
Walter P. Keene
James McKean
Inventor
William R. Fox
by Ellis Spear, Atty.

UNITED STATES PATENT OFFICE.

WILLIAM R. FOX, OF GRAND RAPIDS, MICHIGAN.

DADO-CUTTER.

SPECIFICATION forming part of Letters Patent No. 432,824, dated July 22, 1890.

Application filed September 2, 1889. Serial No. 322,730. (No model.)

*To all whom it may concern:*

Be it known that I, WILLIAM R. FOX, of Grand Rapids, in the county of Kent and State of Michigan, have invented a new and useful Improvement in Dado-Cutters; and I do hereby declare that the following is a full, clear, and exact description of the same.

The invention hereinafter set forth is an improvement which I have made upon a class of saws known as "dado-cutters," and particularly to a special kind of such saws which are adjustable to cut a groove of greater or less width.

The object of my invention is to increase the range of adjustment in a given diameter of saw.

The invention consists, first, in combining with saws set inclined, in whole or part, set in inclined teeth, which aid in effecting the removal of the stock between the saws.

The second part of my invention relates to the construction of the hub, and includes the details by means of which the individual saws are held and the saws are separated or adjusted in respect to each other. The forms of saws included in this application in respect to the portion inclined to and the portion parallel with the arbor are the same as those shown in an application filed by me in the United States Patent Office on the 3d day of August, 1889, Serial No. 319,611.

In the accompanying drawings, Figure 1 shows a section of saw taken through the center of the hub. Fig. 2 is a like section showing the invention applied to another form of saw with a slightly-different construction of hub. Fig. 3 is a similar section of the same form of saw as in Fig. 1, with a modified form of hub. Fig. 4 is a plan view showing the straight teeth of one saw and the bent teeth of the adjoining saw opposite the spaces between the straight teeth. Fig. 5 is a detail view of a part of the periphery of the three saws shown in Fig. 2.

Referring now to Fig. 1, the drawings show a dado-cutter composed of three individual saws, marked, respectively, A B C. They have central plain portions $i$, inclined portions $k$, and marginal portions $l$, as shown in my aforesaid application, the inclined portions being inclined to the arbor of the saw, and the central plane and marginal portions being in a plane at right angles to the said arbor, all as shown more fully in my said application. The saws A and C are fixed to the collars $a$ and $c$, respectively, being set in rabbets in the inner faces of said collars and held therein by means of screws $d$, which are threaded into hollow studs $e$, the heads of which are countersunk into the saws and thereby flush with their inner faces. These collars are threaded, as shown in Figs. 2 and 3, the thread of one being a right-hand thread and the other a left. Fitted to these threaded collars is threaded sleeve D, which is shown as turned down on the left-hand end to receive a supplemental sleeve E, fitted over the reduced end of the sleeve D, and holding between the shoulder on the sleeve D and the inner face of sleeve E the middle saw B. The sleeve E is held upon the reduced end of the sleeve D by means of a screw $f$. The saw B is located in the center of the length of the sleeve D, and one end of this sleeve is threaded on its periphery with a right-hand thread and the other end with a left, to correspond with the right and left hand threads of the collars $a$ $c$, it being understood that the periphery of the sleeve D on the end is formed by the supplemental sleeve E. The sleeve D is turned either right or left to move the saws A C away from the central saw or close them upon it. A pin $m$, inserted through the collars $a$ $c$ and through the saws, holds the saws in proper relation to each other, while the adjusting-sleeve turns within the collars $a$ $c$. The central saw is held in the collar D sufficiently loose to allow the adjusting-sleeve to turn therein.

The saw A has on one side a few of its teeth (ordinarily three) bent inwardly, as shown at $s$, all the rest of the teeth being straight, as shown on the upper edge of the saw at $r$. The saw C has teeth, as shown at $s'$, similarly bent inward at a point diametrically opposite the bent teeth of the saw A. The central saw has bent teeth $s''$ on one side exactly opposite the bent teeth $s$ of the saw A and bent in the same direction as those teeth, while diametrically opposite it has bent teeth $s'''$, corresponding in position and inclination to the bent teeth $s'$ of the saw C. It will be understood that the inclined teeth are opposite in every instance to the spaces between the straight teeth, so as to enter into those spaces when the individual saws are closed upon each other. When the saws are so closed, the cutter is set at its minimum and cuts its narrowest gage possible with the three saws. When the saws are separated, the bent teeth extend into the space between the separated saws, and they are capable of adjustment in expanding the cutter to the extent of bringing the inwardly-inclined teeth of both in the space between two contiguous saws into the same plane, which is at right angles to the arbor. This is true whether considered in relation to the saws A and B or the saws B and C. The amount of possible expansion, therefore, is due in part to the inclination of the teeth, and the whole amount of expansion is equal to the sum of inclination of the saws plus the inclination of the teeth. The walls of the groove will be cut by the straight teeth of the segments $l\ l'$. The cutter is capable of further reduction below the minimum heretofore stated by the removal of the interior saw B.

In Fig. 2 I have shown the first part of the invention applied to a form of saw differing somewhat from that shown in Fig. 1, but shown also in my aforesaid application, but with some difference in the construction of the hub. In this form the parallel segments on the opposite sides of the saw are connected with inclined central portions, the inclination extending all the way across the hub, the central saw G, set in the face of the collar H, being fitted between the inclined faces of the two collars $a'$ and $c'$. The saw F is held to its collar $a'$ by a screw $d$ and hollow stud $e$, as before described, and similar bolts and screws hold the saw G and the saw E to their respective collars, the bolts and studs passing through the collar $c'$ and the intermediate collar H. The saws E G are in fixed relation to each other. The bent teeth $s'$ of the saw E and the bent teeth $s'''$ of the saw G are on opposite sides of their respective saws, and when the saws are set at their maximum distance apart these teeth extend to the same plane, which plane is at right angles to the arbor of the saw.

Fig. 2 shows the cutter set at its minimum. To enlarge the cutting capacity, the sleeve D is turned, (being threaded to the collars $a'\ c'$, as heretofore described in connection with Fig. 1,) and this separates the saws F and G until the inwardly-bent teeth of each coincide in plane, as heretofore described. Manifestly the saws B of Fig. 1 and the saw G of Fig. 2 may both be removed, if it be desired to reduce the cut. When the saw G is removed with its collar H, I use shorter screws and bolts to retain the saw E in place against the collar $c'$.

In Fig. 3 I have shown only two individual saws in the cutter, and these are of the same form as all the saws in Fig. 1, and have the same kind of inwardly-bent teeth. The adjusting-sleeve B' is threaded only in one direction, which may be either right or left hand, and only one of the collars $a^2$ is threaded upon it. The other end of the adjusting-sleeve is turned down, substantially as shown in Fig. 1, to sustain the second saw; but in this case the second saw is supported on the collar $e'$, which collar is fitted on the reduced portion of the adjusting-sleeve, which turns therein. The saws are held in their collars in the manner heretofore described.

While I have shown the inclined teeth upon two forms of saw having a general inclination to the arbor, I do not limit myself to these forms of saw, as they may also be applied to saws having plain surfaces throughout.

I claim as my invention—

1. In combination, a number of saws, each outer saw having a series of inwardly-bent teeth, the bent teeth of one saw varying in position and direction of bend from the bent teeth of the other saw, substantially as described.

2. In combination, outer saws having a series of bent teeth, the bent teeth of one saw varying in position and direction of bend from the bent teeth of the other saw, and a center saw having a series of bent teeth at diametrically-opposite parts of its periphery extending in opposite directions, substantially as described.

3. A dado-cutter consisting of an adjusting-sleeve having a screw-threaded periphery and a saw mounted adjustably thereby, and a second saw stationary in respect to the sleeve and the first saw, substantially as described.

4. In combination, a pair of saws, as A and C, with bent teeth on the saw C arranged opposite to the spaces between the straight teeth of the saw A, substantially as described.

5. In combination, a pair of saws, as A and C, each having inwardly-bent teeth, the bent teeth of one saw being diametrically opposite the bent teeth of the other saw, as and for the purpose set forth.

6. In combination, in a cutter, a saw set upon a collar provided with an interior thread, an adjusting-sleeve threaded thereto and having one end reduced and a second saw supported on the reduced end, substantially as described.

7. In combination, in a cutter, a saw set upon a collar provided with an interior thread, an adjusting-sleeve threaded thereto and having one end reduced and a second saw supported on the reduced end, a supplemental sleeve on the reduced end, and a second collar carrying a saw, the supplemental sleeve and collar being threaded in the direction opposite to that of the first collar, substantially as described.

In testimony whereof I have signed my name to this specification in the presence of two subscribing witnesses.

WILLIAM R. FOX.

Witnesses:
GEO. G. WHITWORTH,
CHAS. F. ROOD.